US008941554B2

(12) United States Patent
Christie

(10) Patent No.: US 8,941,554 B2
(45) Date of Patent: Jan. 27, 2015

(54) ANTI-BACKLASH DEVICE

(75) Inventor: Nathan Andrew Christie, Acworth, GA (US)

(73) Assignee: Pro Band International, Inc., Marietta, GA (US)

(*) Notice: Subject to any disclaimer, the term of this patent is extended or adjusted under 35 U.S.C. 154(b) by 817 days.

(21) Appl. No.: 13/112,111

(22) Filed: May 20, 2011

(65) Prior Publication Data

US 2012/0031222 A1 Feb. 9, 2012

Related U.S. Application Data

(60) Provisional application No. 61/371,570, filed on Aug. 6, 2010.

(51) Int. Cl.

| | |
|---|---|
| ***G05G 5/06*** | (2006.01) |
| ***B23P 11/00*** | (2006.01) |
| ***H01Q 3/08*** | (2006.01) |

(52) U.S. Cl.

CPC ... *G05G 5/06* (2013.01); *H01Q 3/08* (2013.01)
USPC ........ 343/878; 248/514; 248/516; 248/228.3; 411/222; 411/223; 411/226; 16/235; 16/242; 16/245; 16/249; 74/1 R; 74/440; 29/525.11

(58) Field of Classification Search

CPC ............. H01Q 3/08; H01Q 3/04; H01Q 3/06; H01Q 1/1264; H01Q 1/12; H01Q 3/02; H01Q 1/125; F16B 5/02; F16B 39/12; F16B 39/282; F16M 13/022; E04B 1/1906; E04B 1/34352; E04B 2001/1969; B23Q 5/40; G05G 5/06; F16H 25/2006
USPC .......... 411/222, 223, 226; 248/219.2, 288.31, 248/292.12, 292.14, 297.21; 16/235–249; 343/880, 873, 775, 776
See application file for complete search history.

(56) References Cited

U.S. PATENT DOCUMENTS

| | | | | |
|---|---|---|---|---|
| 1,399,461 | A * | 12/1921 | Childs | 248/482 |
| 1,775,525 | A * | 9/1930 | Hedlund | 403/144 |
| 3,533,298 | A * | 10/1970 | Gerber | 74/424.72 |
| 3,546,704 | A * | 12/1970 | Selby et al. | 343/765 |
| 4,593,572 | A * | 6/1986 | Linley, Jr. | 74/424.96 |
| 4,654,670 | A | 3/1987 | Fleming | |
| 4,660,431 | A * | 4/1987 | Heine | 74/89.42 |
| 5,088,852 | A * | 2/1992 | Davister | 403/19 |
| 6,317,093 | B1 * | 11/2001 | Harris | 343/765 |
| 6,657,598 | B2 * | 12/2003 | Tulloch | 343/765 |
| 7,384,209 | B2 | 6/2008 | Muders et al. | |

(Continued)

OTHER PUBLICATIONS

International Search Report and Written Opinion for PCT/US2011/046461, Jan. 10, 2012, copy consists of 11 unnumbered pages.

(Continued)

*Primary Examiner* — Troy Chambers
*Assistant Examiner* — Valentin Craciun
(74) *Attorney, Agent, or Firm* — Wall & Tong LLP

(57) ABSTRACT

The present disclosure relates generally to an anti-backlash component. In one embodiment, the anti-backlash component includes a housing, the housing comprising a first threaded opening and a second opening, a bolt coupled to the housing through the first threaded opening and the second opening, the bolt comprising a spherical end, a nut coupled to the bolt and an exterior side of the second opening of the housing and a socket coupled to the spherical end of the bolt.

13 Claims, 16 Drawing Sheets

(56) References Cited

U.S. PATENT DOCUMENTS

| | | | | |
|---|---|---|---|---|
| 7,609,218 | B2 * | 10/2009 | Frye et al. | 343/765 |
| 2003/0033760 | A1 * | 2/2003 | Rogers et al. | 52/167.7 |
| 2006/0185613 | A1 * | 8/2006 | Burrell | 119/468 |
| 2007/0195006 | A1 | 8/2007 | Frye et al. | |
| 2009/0245969 | A1 * | 10/2009 | White et al. | 411/215 |

OTHER PUBLICATIONS

Canadian Office Action dated May 27, 2014 from CA Application No. 2,807,592, pp. 1-2.

* cited by examiner

100

100

100

ANTI-BACKLASH DEVICE

CROSS REFERENCE TO RELATED APPLICATIONS

This application claims the benefit of U.S. Provisional Patent Application Ser. No. 61/371,570, filed on Aug. 6, 2010, which is herein incorporated by reference in its entirety.

BACKGROUND

During installation of a satellite dish, proper alignment is important for proper reception. For example, mounting brackets may have some means to adjust alignment of the satellite dish.

However, currently when a technician performs a fine adjustment on the satellite dish, the current design of mounting brackets introduce backlash. Backlash may be defined as a moment in time when threads of a bolt or a screw and threads of a corresponding opening are not in contact. For example, as a bolt is screwed in one direction into the corresponding opening and then turned in an opposite direction, there is a moment in time when the threads are not in contact. As a result, when the technician is turning the bolt in one direction and then in an opposite direction to perform fine adjustment nothing may happen for a few turns of the bolt during the fine adjustment. This backlash leads to inefficiency during the installation and fine adjustment of the satellite dish.

SUMMARY

In one embodiment, the present disclosure describes an anti-backlash component. In one embodiment, the anti-backlash component comprises a housing, the housing comprising a first threaded opening and a second opening, a bolt coupled to the housing through the first threaded opening and the second opening, the bolt comprising a spherical end, a nut coupled to the bolt and an exterior side of the second opening of the housing and a socket coupled to the spherical end of the bolt.

In another embodiment, the present disclosure describes an anti-backlash assembly. The anti-backlash assembly comprises an anti-backlash component, a base plate and a bracket. The anti-backlash assembly component comprises a housing, the housing comprising a first threaded opening and a second opening, a bolt coupled to the housing through the first threaded opening and the second opening, the bolt comprising a spherical end, a nut coupled to the bolt and an exterior side of the second opening of the housing and a socket coupled to the spherical end of the bolt. The base plate is coupled to the socket of the anti-backlash component and the bracket is movably coupled to the housing of the anti-backlash component via a first fastener and movably coupled to the base plate via a second fastener.

In another embodiment, the present disclosure describes a method for method for preventing backlash. In one embodiment, the method comprises providing a housing, the housing comprising a first threaded opening and a second opening, coupling a bolt to the housing through the first threaded opening and the second opening, the bolt comprising a spherical end, coupling a nut to the bolt and an exterior side of the second opening of the housing in a direction that applies a force opposing a force applied by the bolt to remove backlash and coupling a socket to the spherical end of the bolt via an interference fit.

BRIEF DESCRIPTION OF THE DRAWINGS

So that the manner in which the above recited features of the present invention can be understood in detail, a more particular description of the invention may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures.

DETAILED DESCRIPTION

Figure 1:
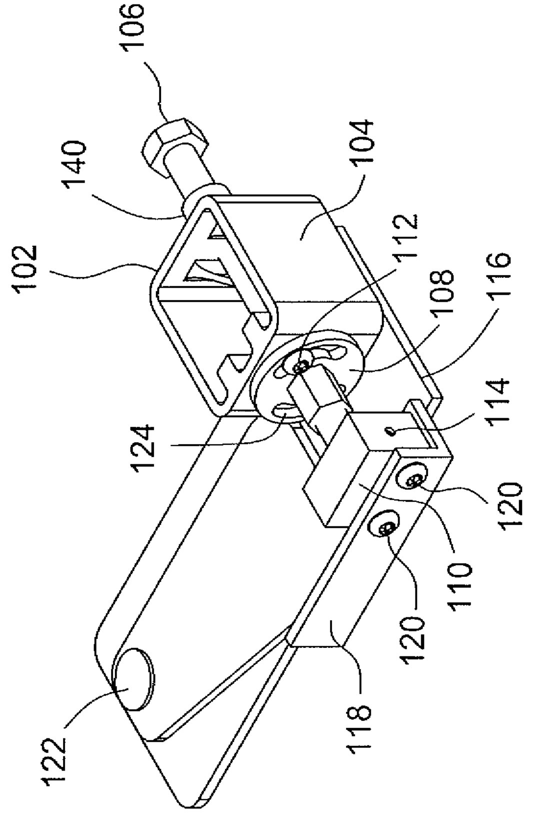
FIG. 1 depicts a first isometric view of one embodiment of an anti-backlash assembly.

Embodiments of the present disclosure are directed towards an anti-backlash assembly 100 illustrated in FIG. 1. FIG. 1 illustrates an isometric front view of the anti-backlash assembly 100. The anti-backlash assembly 100 prevents backlash between threads of a bolt and threaded opening to allow for more accurate fine adjustments. In addition, a more efficient fine adjustment is possible as each movement of the threads causes an adjustment since there is no backlash using the anti-backlash assembly 100. The anti-backlash assembly 100 may be used for fine adjustment during a satellite installation in any axis, e.g., an azimuth axis, an elevation axis and/or a skew axis. In addition, it should be noted that the anti-backlash assembly 100 may be scaled to any size depending on the requirements for an installation. For example, if a large satellite dish is being installed, the anti-backlash assembly 100 may be scaled to a larger size accordingly. In addition, if a smaller satellite dish is being installed, the anti-backlash assembly 100 may be scaled to a smaller size accordingly.

The anti-backlash assembly 100 includes an anti-backlash component 102. The anti-backlash component 102 includes an anti-backlash housing 104 (also referred to as the housing 104), an anti-backlash adjustment bolt 106 (also referred to as the bolt 106), an anti-backlash removal nut 108 (also referred to as the nut 108) and an anti-backlash socket 110 (also referred to as the socket 110). The bolt 106 is fitted through a threaded opening 140 of the housing 104 and a second opening (not shown) on an opposite side of the threaded opening 140. For example, an end of the bolt 106 is inserted into the threaded opening 140 and exits out of the second opening.

The bolt 106 is then fitted through the anti-backlash removal nut 108. In one embodiment, the bolt 106 may also be threaded through a threaded opening in the anti-backlash removal nut 108.

An end of the bolt 106 is fitted to the anti-backlash socket 110. The bolt 106 and the anti-backlash socket 110 are coupled together via an interference fit. In other words, the bolt and the anti-backlash socket 110 must be coupled together very tightly to help remove backlash between threads on the bolt 106 and threads in the opening 140 of the housing 104.

In one embodiment, the anti-backlash socket 110 includes an opening 114 on a side of the anti-backlash socket 110. An optional screw (e.g., a plastic screw as discussed in further detail below) may be inserted into the opening 114. The screw may be screwed into the opening 114 until the screw comes into contact with the bolt 106. The screw helps to promote the tight fit between the bolt 106 and the anti-backlash socket 110.

In one embodiment, the anti-backlash removal nut 108 is coupled to the bolt 106 via a threaded opening (discussed in further detail below in FIGS. 23-25). The anti-backlash removal nut 108 is also coupled to the housing 104 via one or more screws 112. The screws 112 are fitted through one or more slots 124 and then screwed into the housing 104. In one embodiment, the one or more slots 124 may have a semi-circular shape. This provides a tolerance for the screws 112 as the anti-backlash removal nut 108 is rotated when the anti-backlash removal nut 108 is being tightened.

The anti-backlash removal nut 108 is tightened to apply a force in a direction that is opposite a force applied by the bolt 106. In other words, the anti-backlash removal nut 108 applies a force against the bolt 106 such that the threads of the bolt 106 and the threads of the threaded opening 140 of the housing 140 are always in contact. Said another way, there is no moment in time when the threads are not in contact. As a result, a more accurate and more efficient fine adjustment of a satellite dish may be performed during installation.

In one embodiment, the housing 104 is movably coupled to a bracket 116. The anti-backlash socket 110 is coupled to a base plate 118 via one or more screws 120. The bracket 116 and the base plate 118 are then movably coupled together via a fastener 122. In one embodiment, the fastener 122 may be any fastener that allows for rotational movement, e.g., a rivet. The fastener 122 may be used to allow for wider tolerances and/or clearances in the holes of the bracket 116 and the base plate 118 during manufacturing. The use of the fastener 122 also allows the anti-backlash component 102 to have one or more linear configurations as discussed below with reference to FIGS. 26-28. The anti-backlash assembly 100 may also have one or more corresponding rotational configurations as discussed below with reference to FIGS. 29-31.

Figure 2:
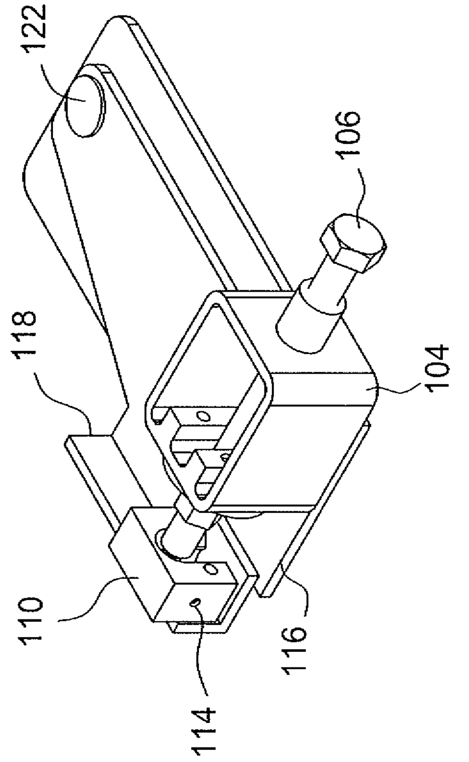
FIG. 2 depicts a second isometric view of one embodiment of the anti-backlash assembly.
Figures 3, 4, 5, 6:
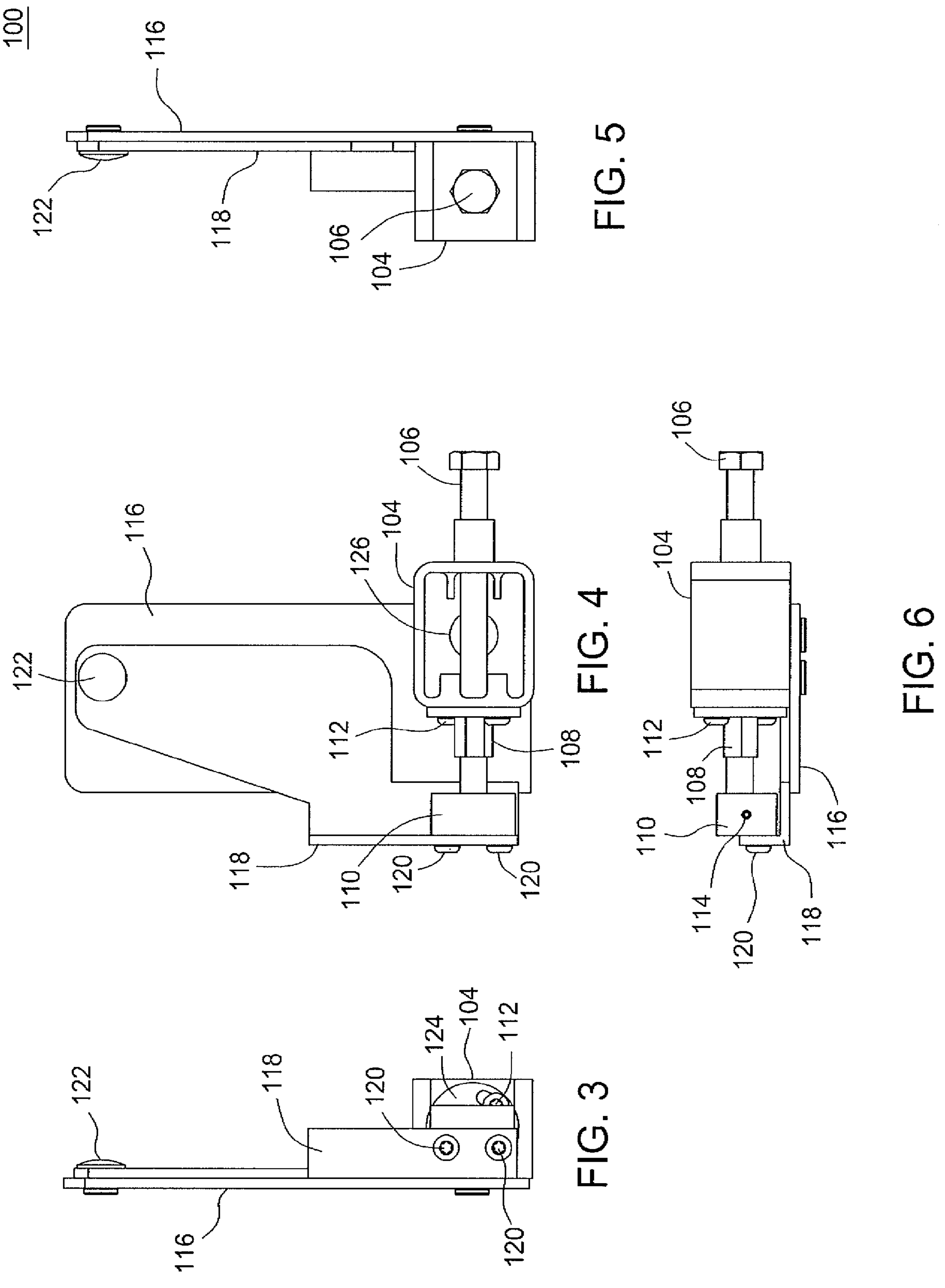
FIG. 3 depicts a first side view of one embodiment of the anti-backlash assembly.
FIG. 4 depicts a top plan view of one embodiment of the anti-backlash assembly.
FIG. 5 depicts a second side view of one embodiment of the anti-backlash assembly.
FIG. 6 depicts a longitudinal view of one embodiment of the anti-backlash assembly.

FIGS. 2-4 illustrate other various views of the anti-backlash assembly 100. For example, FIG. 2 illustrates an isometric back view of the anti-backlash assembly 100. FIG. 3 illustrates a first side view of the anti-backlash assembly 100.

FIG. 4 illustrates a top plan view of the anti-backlash assembly 100. FIG. 4 illustrates a rivet 126 that is used to movably couple the housing 104 to the bracket 116. Similar to the fastener 122, the rivet 126 allows for wider tolerances and/or clearances in the holes of the base plate 118 and the housing 104 during manufacturing.

FIG. 5 illustrates a second side view of the anti-backlash assembly 100. FIG. 6 illustrates a longitudinal view of the anti-backlash assembly 100.

Figure 7:
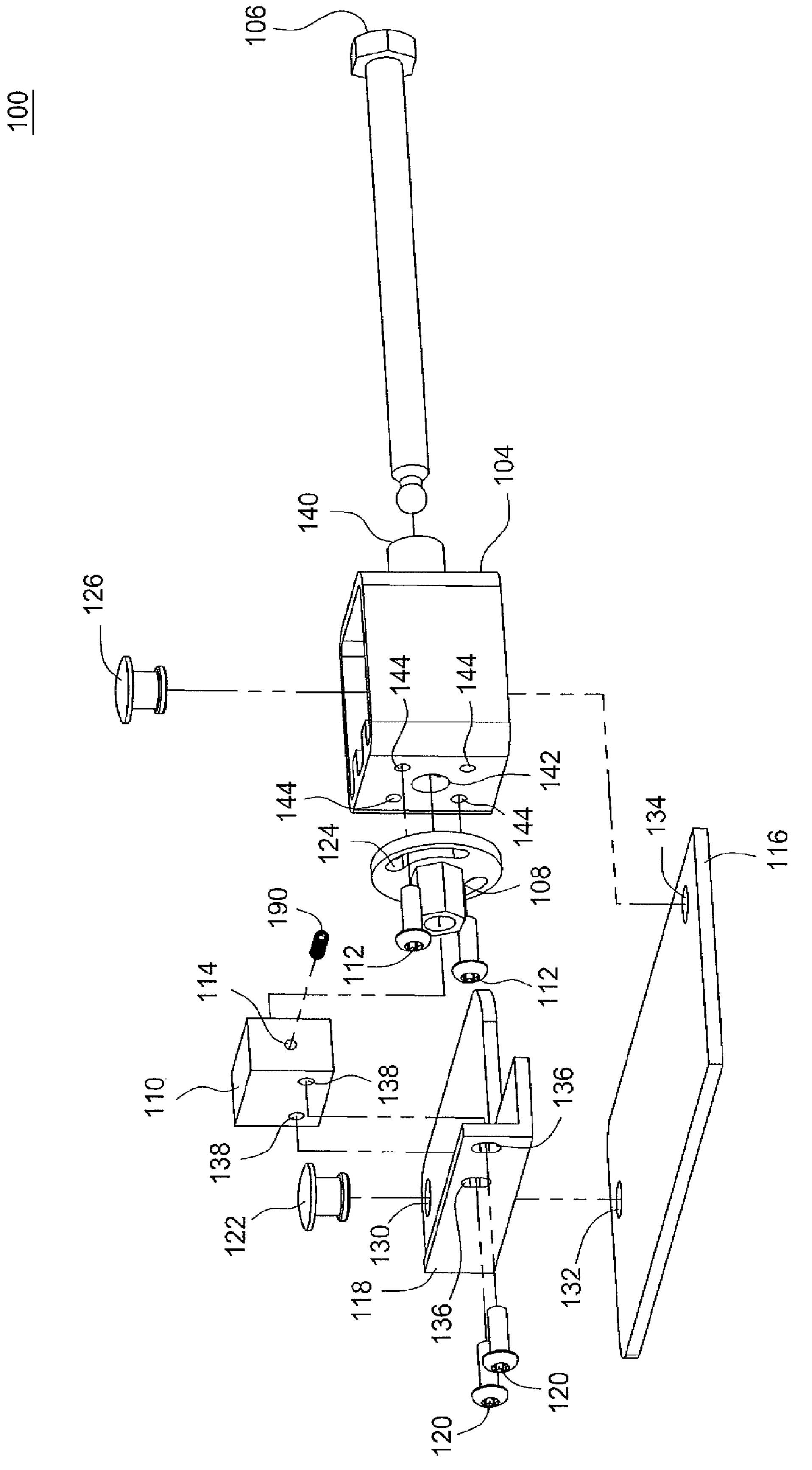
FIG. 7 depicts an exploded isometric view of one embodiment of the anti-backlash assembly.

FIG. 7 illustrates an isometric exploded view of the anti-backlash assembly 100. The exploded view illustrated in FIG. 7 provides a more detailed illustration of the various openings and how various screws are coupled to the various components. For example, the bolt 106 is inserted into the threaded opening 140 and through the housing 104 and out of a second opening 142 on a side opposite of the threaded opening 140. The second opening 142 may optionally be threaded.

The bolt 106 continues through the anti-backlash removal nut 108. The screws 112 may couple the anti-backlash removal nut 108 to the housing via the slots 124 of the anti-backlash removal nut 108 and one or more openings 144 of the housing 104.

The housing 104 is movably coupled to the bracket 116 via the rivet 126 coupling an opening 134 in the bracket 116 to the housing 104. The anti-backlash socket 110 is coupled to the base plate 118 via the screws 120 that are connected through one or more openings 136 of the base plate 118 and one or more openings 138 of the anti-backlash socket 110.

FIG. 7 further illustrates a screw 190 that may be used to help provide a tight fit between the bolt 106 and the anti-backlash socket 110 should a proper interference fit not be made. For example, the screw 190 may be screwed into the opening 114 until the screw 190 contacts the bolt 106. In one embodiment, the screw 190 may be a plastic screw. FIG. 7 further illustrates how the bracket 116 and the base plate 118 are coupled together via the fastener 122 that is fed through an opening 130 of the base plate 118 and an opening 132 of the bracket 116.

Figure 8:
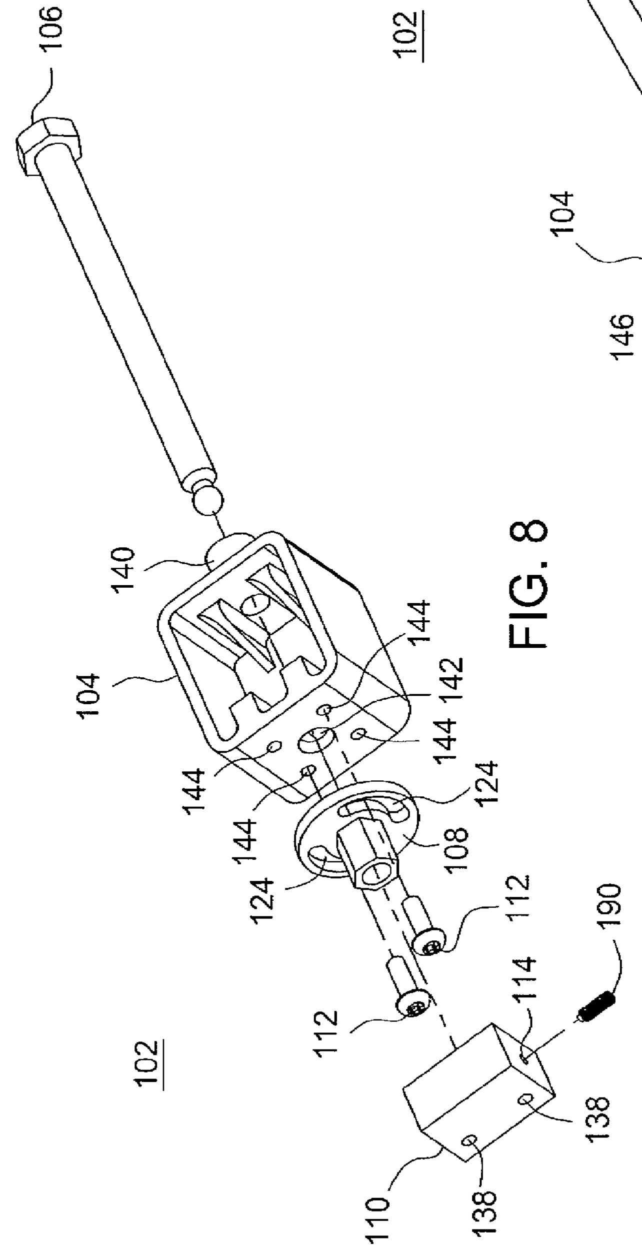
FIG. 8 depicts an exploded top isometric view of one embodiment of the anti-backlash components.
Figure 9:
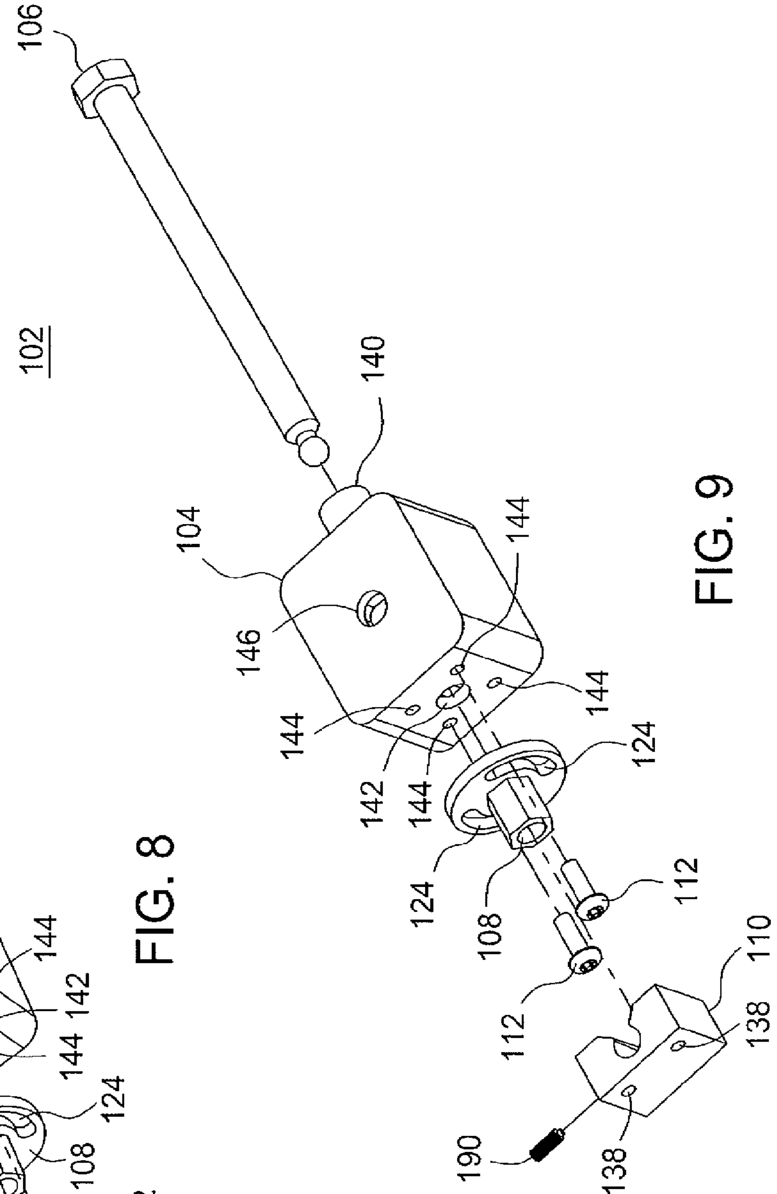
FIG. 9 depicts an exploded bottom isometric view of one embodiment of the anti-backlash components.

FIGS. 8 and 9 illustrate an exploded top isometric view of only the components of the anti-backlash component 102 and an exploded bottom isometric view of only the components of the anti-backlash component 102, respectively. FIG. 9 illustrates an opening 146 on a bottom side of the housing 104 that is used to allow the rivet 126 illustrated in FIGS. 4 and 7 to couple the housing 104 to the bracket 116.

Figure 11:
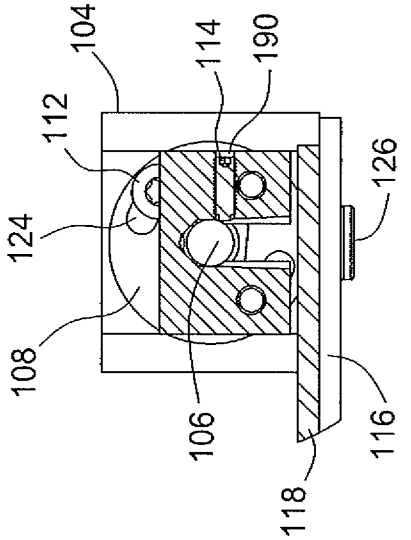
FIG. 11 depicts a cross-sectional view of an anti-backlash socket on the anti-backlash assembly.
Figure 10:
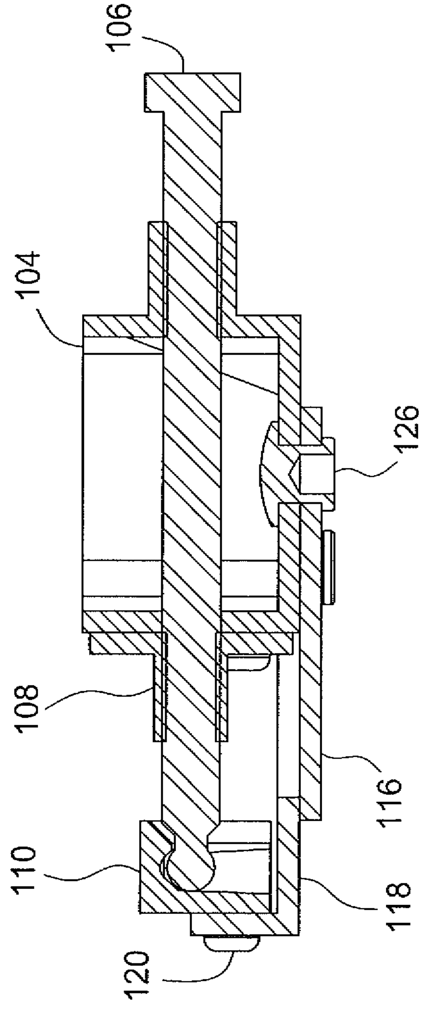
FIG. 10 depicts a longitudinal cross-sectional view of one embodiment of the anti-backlash assembly.

FIGS. 10-13 illustrate various cross-sectional views of the anti-backlash assembly 100. For example, FIG. 10 illustrates a longitudinal cross sectional view of one embodiment of the anti-backlash assembly 100. FIG. 11 illustrates a cross-sectional view of the anti-backlash socket 110. The cross-sectional view in FIG. 11 helps to illustrate how the screw 190 is threaded into the opening 114 and makes contact with the bolt 106.

Figure 13:
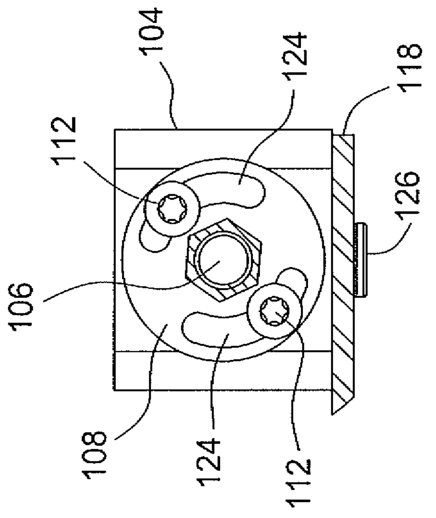
FIG. 13 depicts a side view of the anti-backlash assembly without the anti-backlash socket.
Figure 12:
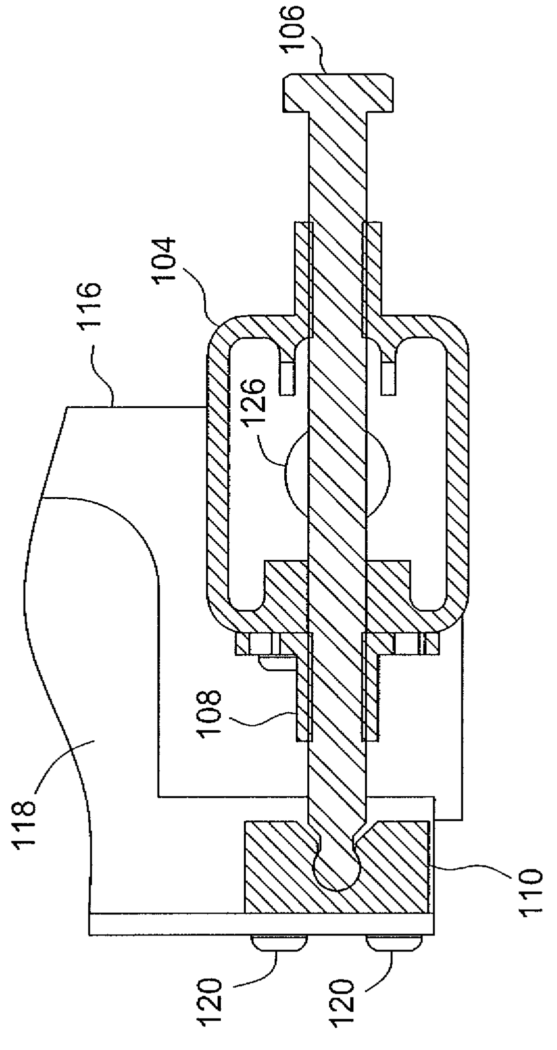
FIG. 12 depicts a top cross sectional view of one embodiment of the anti-backlash assembly.

FIG. 12 illustrates a top cross sectional view of one embodiment of the anti-backlash assembly 100. FIG. 12 helps to illustrate how the bolt 106 is fed through and coupled to the various components of the anti-backlash assembly 100. FIG. 13 illustrates a side view of the anti-backlash assembly 100 without the anti-backlash socket 110.

Figure 14:
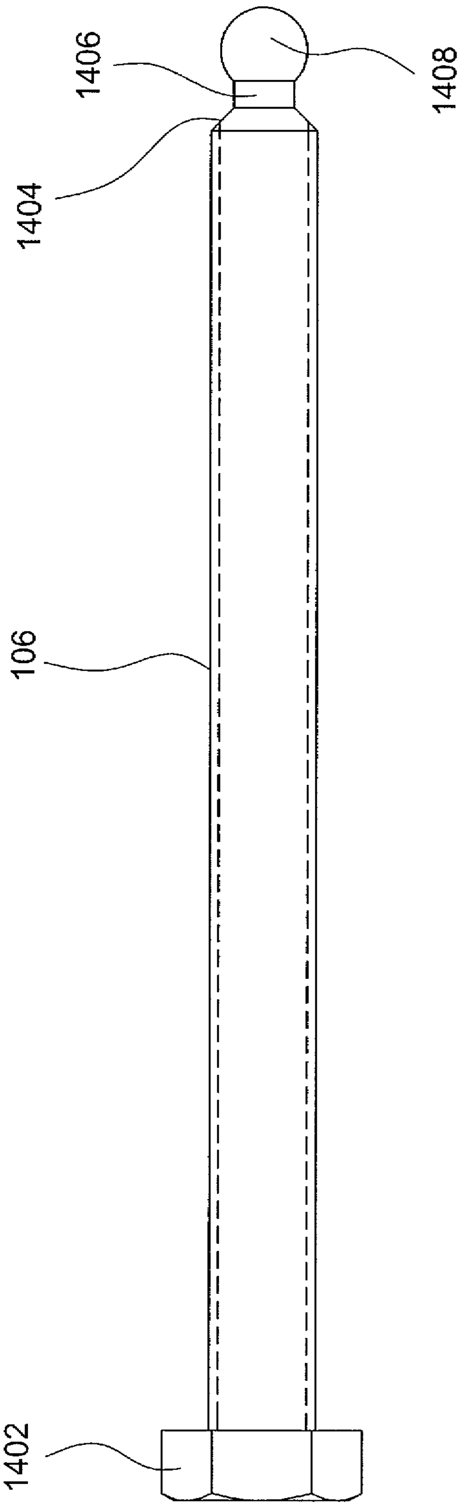
FIG. 14 depicts a side view of one embodiment of an anti-backlash adjustment bolt.
Figure 16:
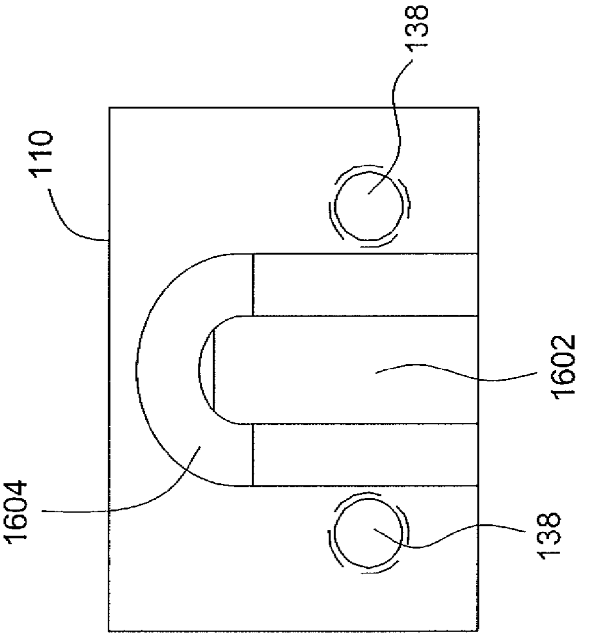
FIG. 16 depicts a front plan view of one embodiment of the anti-backlash socket.

FIG. 14 illustrates a more detailed side view of one embodiment of the bolt 106. FIGS. 15-18 illustrate more detailed views of the anti-backlash socket 110. The bolt 106 in FIG. 14 and the anti-backlash socket 110 in FIGS. 15-18 will be discussed in further detail with reference to one another.

In one embodiment, the bolt 106 may be threaded. The bolt 106 includes a head portion 1402. The head portion 1402 may have a hexagonal shape to be turned with a hex wrench or may include a slot or a Phillips head to be turned with a screwdriver.

The bolt 106 also includes a tapered end 1404 and a spherical end 1408 that is coupled via a neck portion 1406. In one embodiment, the spherical end 1408 is mated with an opening 1602 of the anti-backlash socket 110, illustrated in FIGS. 15-17. The opening 1602 is formed via an opening on a bottom side of the anti-backlash socket 110. The opening 1602 comprises a chamfered edge 1604. In addition, the chamfered edge 1604 allows the bolt 106 to move and rotate in a full range of motion.

Figure 15:
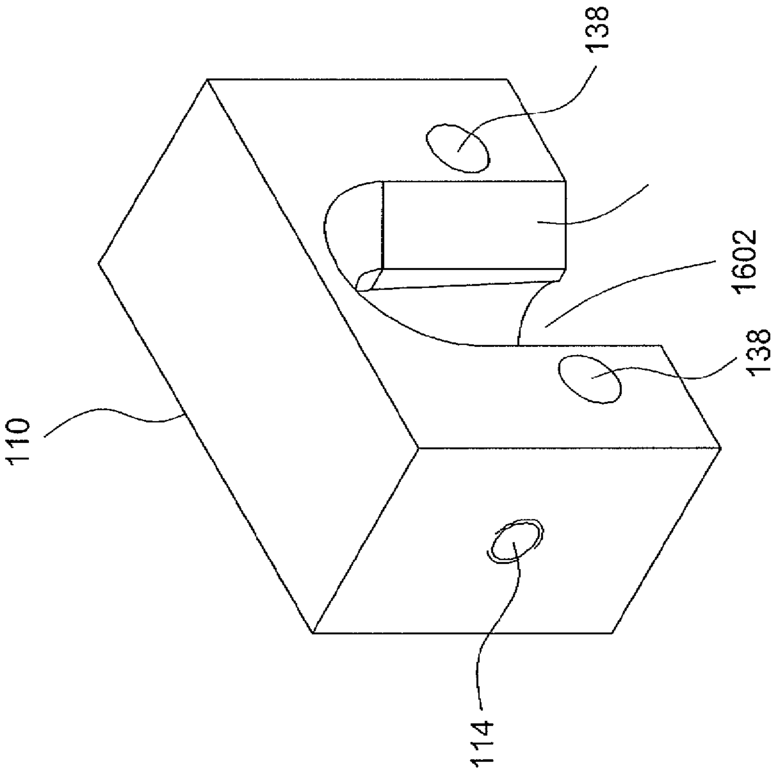
FIG. 15 depicts an isometric view of one embodiment of the anti-backlash socket.
Figure 18:
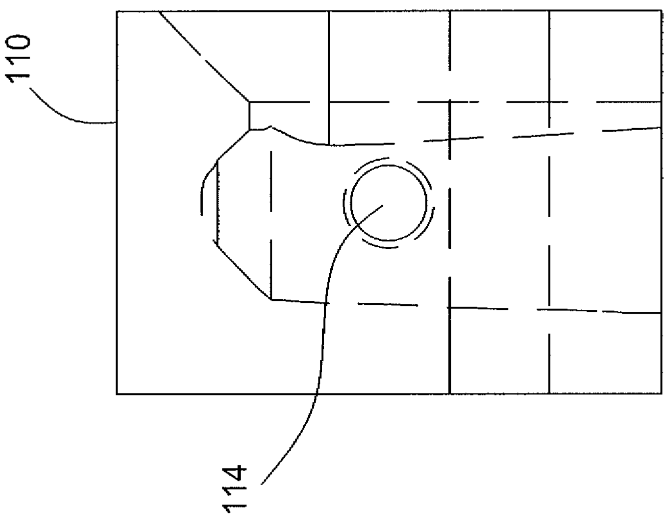
FIG. 18 depicts a side plan view of one embodiment of the anti-backlash socket.
Figure 17:
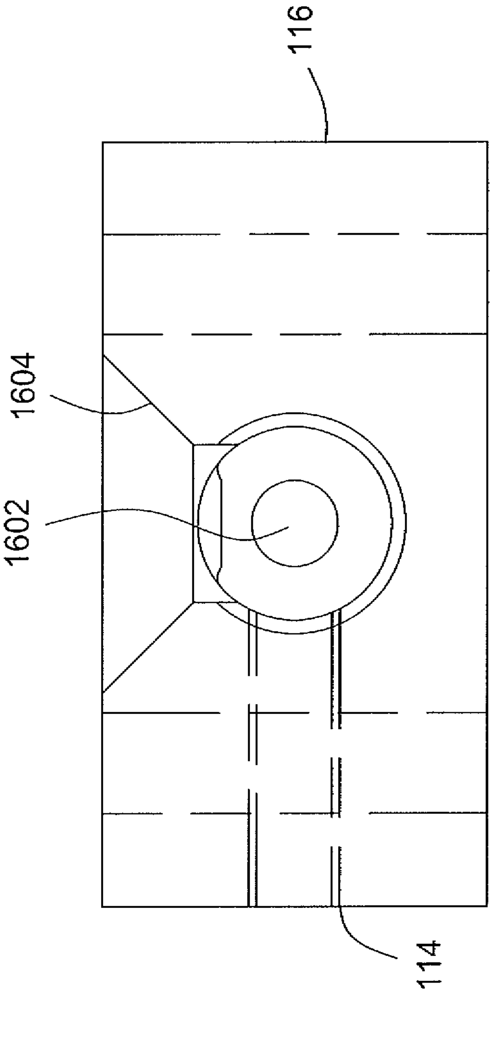
FIG. 17 depicts a bottom plan view of one embodiment of the anti-backlash socket.

As discussed above, the bolt 106 is coupled to the anti-backlash socket 110 via an interference fit. In other words, the fit between the spherical end 1408 of the bolt 106 and the opening 1602 of the anti-backlash socket 110 must be very tight in order to ensure that backlash is removed. However, to improve manufacturing efficiency of the bolt 106 and the anti-backlash socket 110, a screw may be used in the opening 114 to ensure a tight fit if the bolt 106 and the anti-backlash socket 110 do not provide an interference fit. FIGS. 15, 17 and 18 illustrate the opening 114 that may be used to insert a screw, e.g., the screw 190, to ensure the tight fit.

Figure 20:
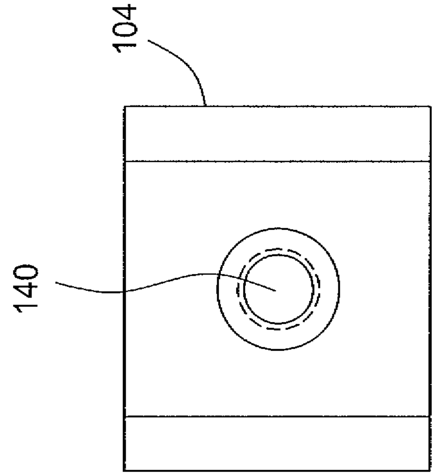
FIG. 20 depicts a front plan view of one embodiment of the anti-backlash housing.
Figure 19:
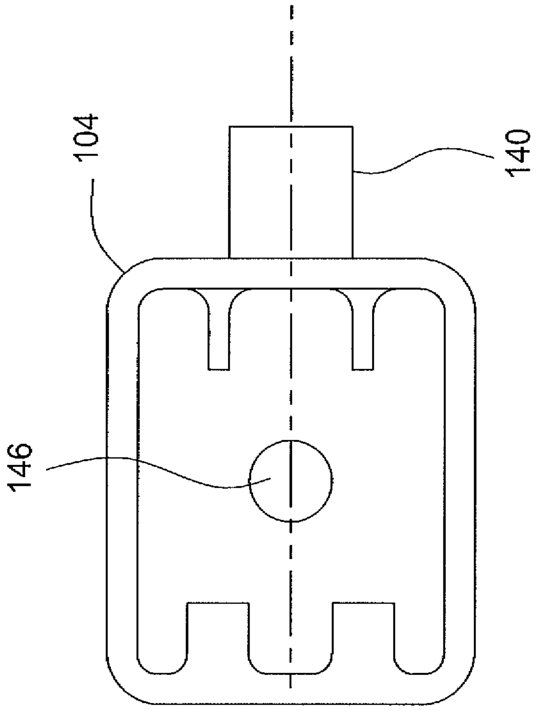
FIG. 19 depicts a top plan view of one embodiment of an anti-backlash housing.
Figure 22:
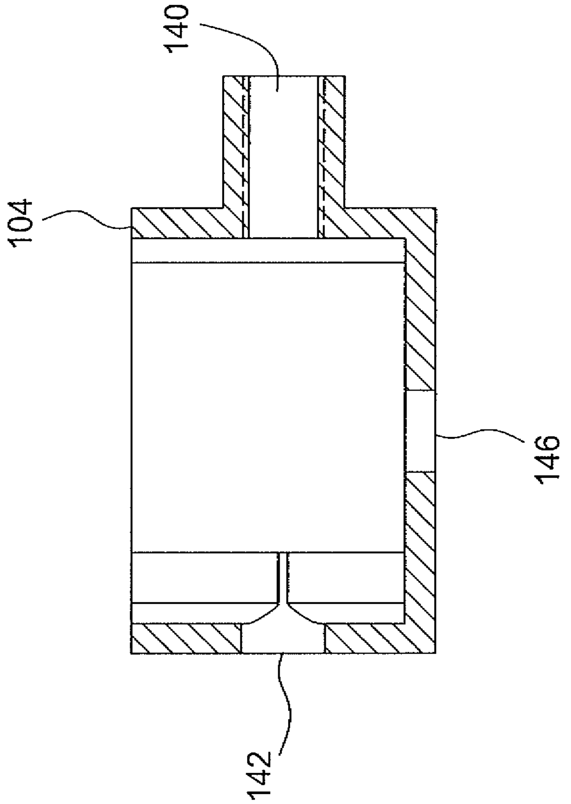
FIG. 22 depicts a side cross-sectional view of one embodiment of the anti-backlash housing.
Figure 21:
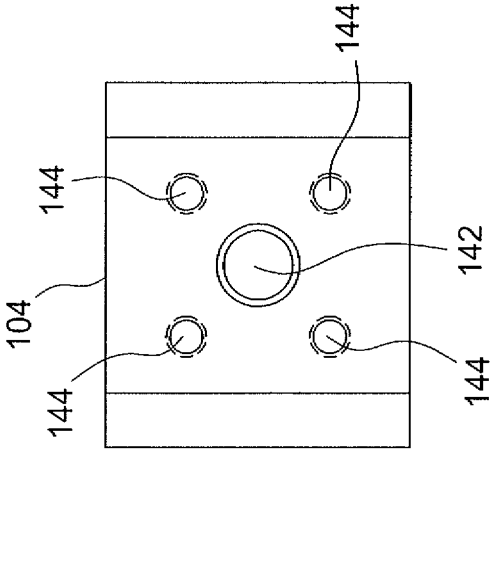
FIG. 21 depicts a back plan view of one embodiment of the anti-backlash housing.

FIGS. 19-22 illustrate various views of the housing 104. FIG. 19 illustrates a top plan view of one embodiment of the housing 104. FIG. 20 illustrates a front plan view of the housing 104. FIG. 21 illustrates a back plan view of the housing 104. FIG. 22 illustrates a side cross-sectional view o f the housing 104.

Figure 25:
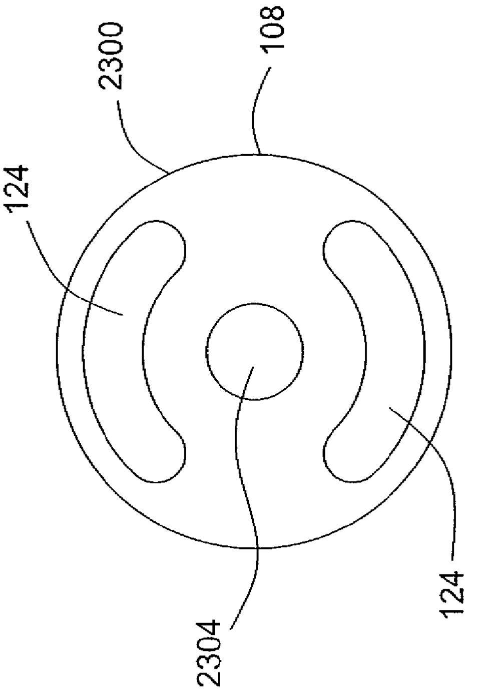
FIG. 25 depicts a back plan view of one embodiment of the anti-backlash removal nut.
Figure 24:
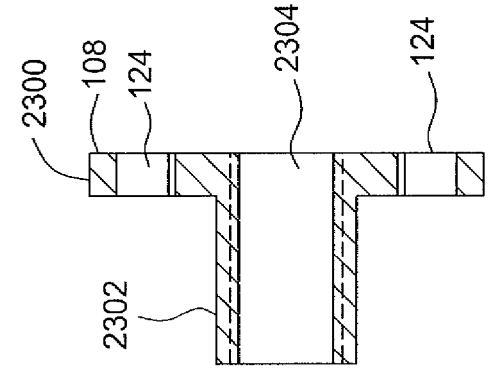
FIG. 24 depicts a side cross-sectional view of one embodiment of the anti-backlash removal nut.
Figure 23:
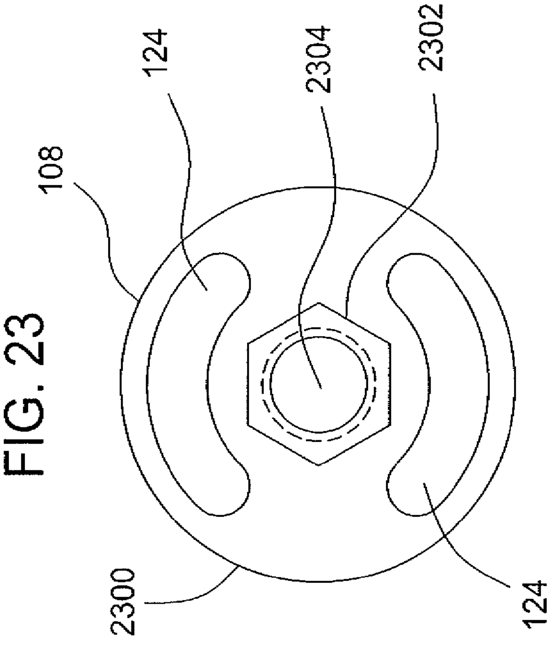
FIG. 23 depicts a front plan view of one embodiment of an anti-backlash removal nut.

FIGS. 23-25 illustrate various views of the anti-backlash removal nut 108. FIG. 23 illustrates a front plan view of the anti-backlash removal nut 108. FIG. 23 provides more detail on an extended portion 2302 having an opening 2304 of the anti-backlash removal nut 108. A perimeter of the extended portion 2302 may have a hexagonal shape to allow for tightening via a wrench. However, it should be noted that the perimeter of the extended portion 2302 may be any shape that allows for tightening of the anti-backlash removal nut 108.

In one embodiment, the opening 2304 may be threaded. As a result, the bolt 106 may be threaded through the opening 2302 and the anti-backlash removal nut 108 may be tightened against the bolt 106 and the housing 104 to apply a force opposite a force applied by the bolt to remove the backlash.

FIG. 24 illustrates a cross-sectional view of one embodiment of the anti-backlash removal nut 108. FIG. 24 illustrates how the extended portion 2302 may protrude out from a base 2300 of the anti-backlash removal nut 108. FIG. 25 illustrates a back plan view of the anti-backlash removal nut 108.

Figure 28:
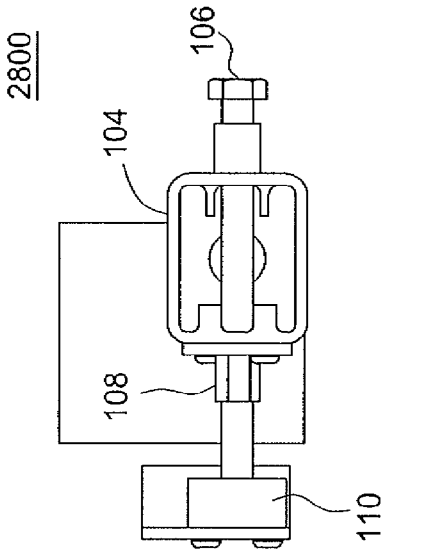
FIG. 28 depicts an adjusted out linear configuration of the anti-backlash assembly.
Figure 26:
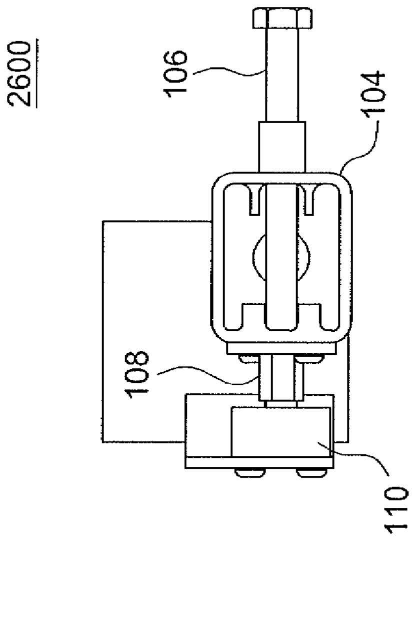
FIG. 26 depicts an adjusted in linear configuration of the anti-backlash assembly.
Figure 29:
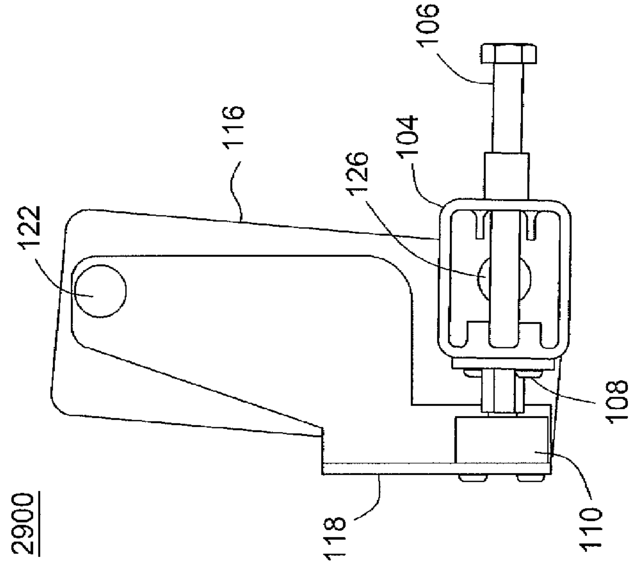
FIG. 29 depicts an adjusted in rotational configuration of the anti-backlash assembly.

FIGS. 26-31 illustrate various linear and rotational configurations of the anti-backlash component 102 and the anti-backlash assembly 100. For example, the bolt 106 may be turned to align the satellite dish properly. FIG. 26 illustrates an adjusted in linear configuration 2600. For example, the bolt 106 may be turned to move the housing 104 and the anti-backlash removal nut 108 closer to the anti-backlash socket 110. Corresponding to the adjusted in linear configuration 2600, FIG. 29 illustrates an adjusted in rotational configuration 2900. For example, the base plate 118 may pivot around the fastener 122 and move to the right relative to the bracket 116.

Figure 27:
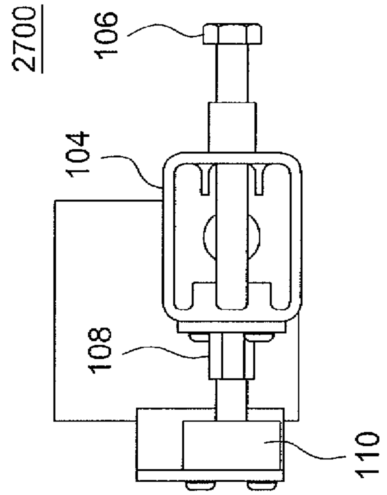
FIG. 27 depicts an on center linear configuration of the anti-backlash assembly.
Figure 30:
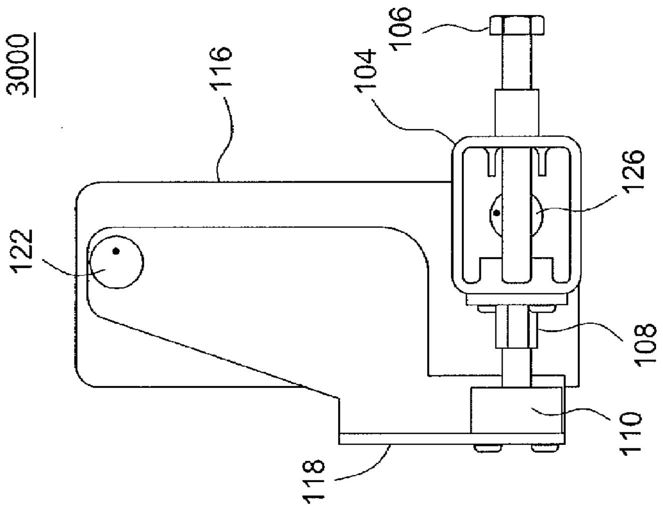
FIG. 30 depicts an on center rotational configuration of the anti-backlash assembly.

FIG. 27 illustrates an on center linear configuration 2700. For example, the bolt 106 may be turned to move the housing 104 and the anti-backlash removal nut 108 to about a center of the bolt 106. Corresponding to the on center linear configuration 2700, FIG. 30 illustrates an on center rotational configuration 3000. For example, the base plate 118 and the bracket 116 may be centered. Said another way, the edges of the base plate 118 and the bracket 116 may be parallel to one another.

Figure 31:
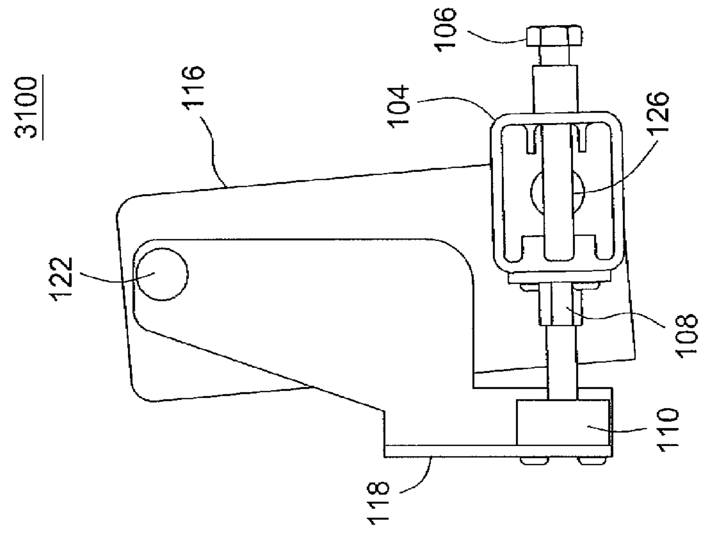
FIG. 31 depicts an adjusted out rotational configuration of the anti-backlash assembly.

FIG. 28 illustrates an adjusted out linear configuration 2800. For example, the bolt 106 may be turned to move the housing 104 and the anti-backlash removal nut 108 further away from the anti-backlash socket 110. Corresponding to the adjusted out linear configuration 2800, FIG. 31 illustrates an adjusted out rotational configuration 3100. For example, the base plate 118 may pivot around the fastener 122 and move to the left relative to the bracket 116.

Figure 32:
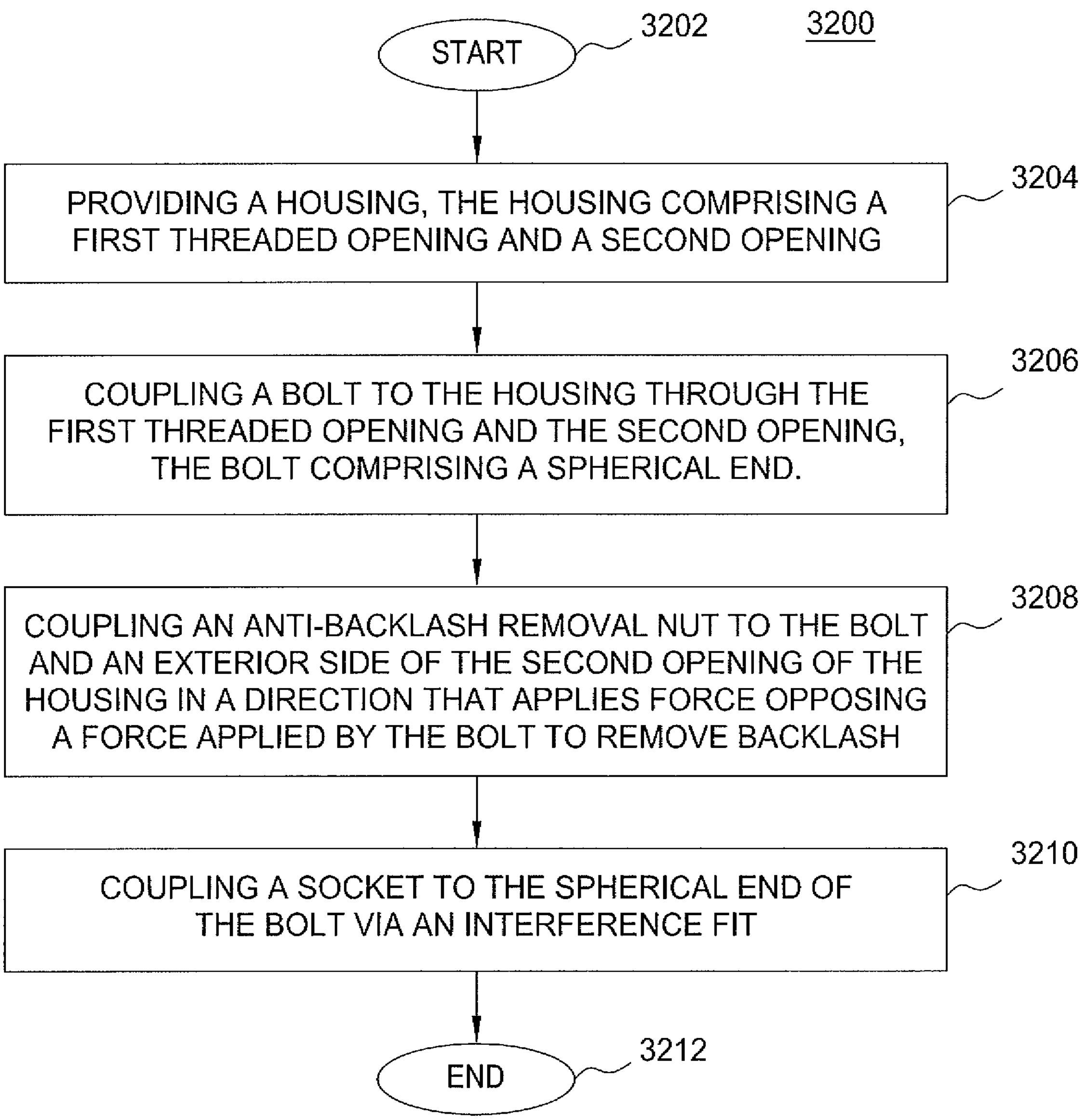
FIG. 32 depicts a flow chart for one embodiment of a method for prevent backlash.

FIG. 32 illustrates one embodiment of a method 3200 for removing backlash. In one embodiment, the method 3200 may be performed by the anti-backlash assembly 100. The method 3200 begins at step 3202.

At step 3204, the method 3200 provides a housing. The housing comprises a first threaded opening and a second opening.

At step 3206, the method 3200 couples a bolt to the housing through the first threaded opening and the second opening. In one embodiment, the bolt comprises a spherical end.

At step 3208, the method 3200 couples an anti-backlash removal nut to the bolt and an exterior side of the second opening of the housing in a direction that applies force opposing a force applied by the bolt to remove backlash. As a result, a better fine adjustment can be performed as the backlash is removed and each turn of the bolt provides an adjustment. In other words, the threads of the bolt and the housing are always in contact. Said another way, there is never a moment in time when the threads are not in contact.

At step 3210, the method 3200 couples a socket to the spherical end of the bolt via an interference fit. The method ends at step 3212.

Figure 33:
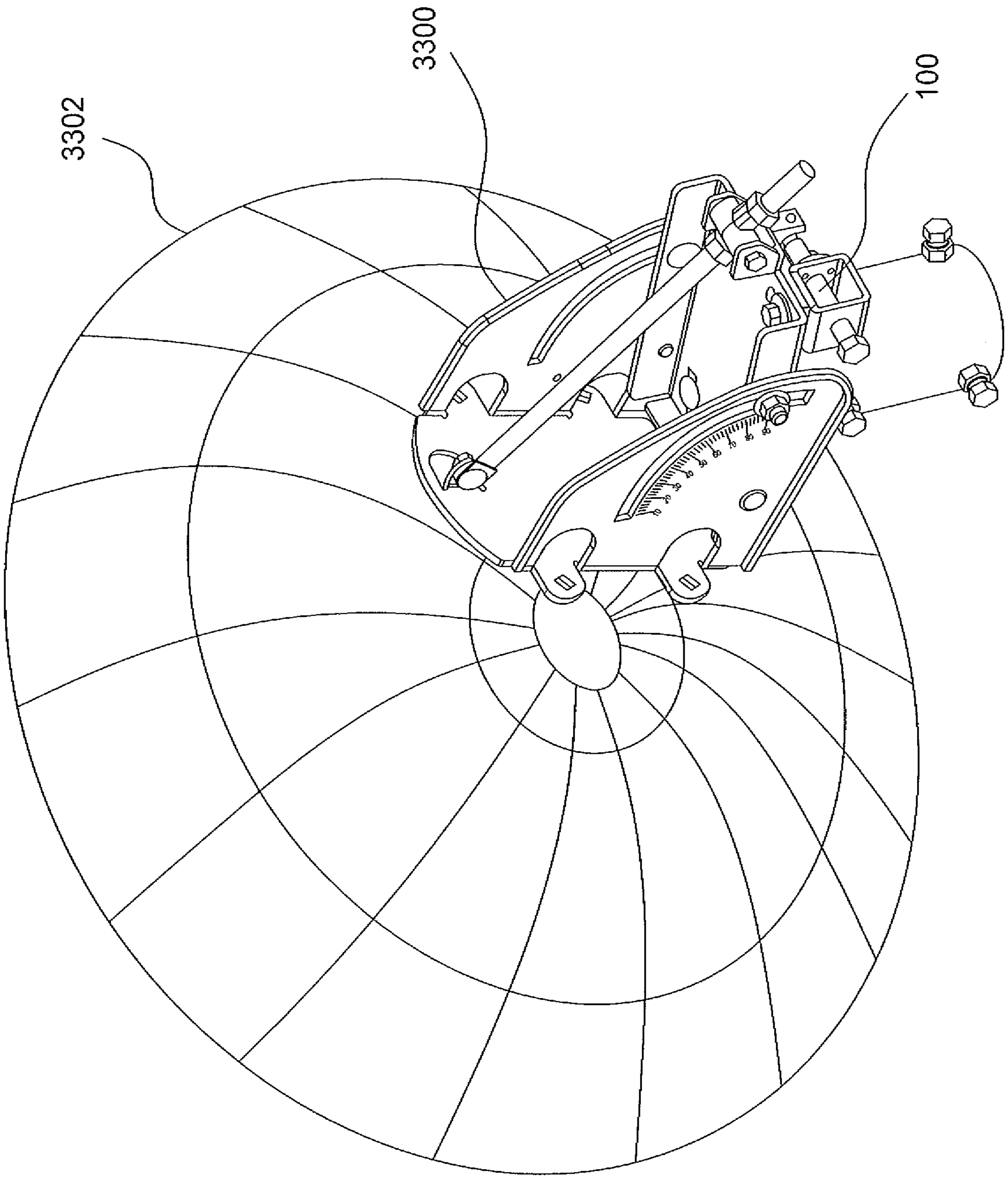
FIG. 33 depicts an example of the anti-backlash assembly 100 coupled to a mounting bracket for a satellite dish.

FIG. 33 illustrates one embodiment of how the anti-backlash assembly 100 is coupled to a mounting bracket 3300 for a satellite dish 3302.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. An anti-backlash component, comprising:

a housing, the housing comprising a first threaded opening and a second opening;

a bolt comprising a head portion and a spherical end, wherein the bolt is coupled to the housing through the first threaded opening and the second opening such that the head portion remains external to the first threaded opening;

a nut coupled to the bolt and an exterior side of the second opening of the housing, wherein the nut comprises at least one slotted opening having a semi circular shape to provide a tolerance for one or more fasteners as the nut is rotated, wherein the nut is coupled to the housing via the one or more fasteners inserted through the at least one slotted opening and connected to a respective opening in the housing; and a socket coupled to the spherical end of the bolt, wherein the bolt is capable of being turned to move the housing and the nut linearly between an adjusted in position, an on center position and an adjusted out position;

wherein the nut is coupled to the bolt in a direction that applies a force opposing a force applied by the bolt to remove backlash.

2. The anti-backlash component of claim 1, wherein the socket and the spherical end of the bolt are coupled via an interference fit.

3. The anti-backlash component of claim 1, wherein the socket comprises a chamfered bottom opening.

4. The anti-backlash component of claim 1, wherein the socket comprises an opening on a side.

5. The anti-backlash component of claim 4, further comprising:

a screw inserted into the opening on the side of the socket and in contact with the spherical end of the bolt.

6. The anti-backlash component of claim 1, wherein the anti-backlash component is coupled to a mounting bracket for a satellite dish.

7. An anti-backlash assembly, comprising:

an anti-backlash component, the anti-backlash component comprising:

a housing, the housing comprising a first threaded opening and a second opening;

a bolt comprising a head portion and a spherical end, wherein the bolt is coupled to the housing through the first threaded opening and the second opening such that the head portion remains external to the first threaded opening;

a nut coupled to the bolt and an exterior side of the second opening of the housing, wherein the nut comprises at least one slotted opening having a semi circular shape to provide a tolerance for one or more fasteners as the nut is rotated, wherein the nut is coupled to the housing via the one or more fasteners inserted through the at least one slotted opening and connected to a respective opening in the housing; and a socket coupled to the spherical end of the bolt, wherein the bolt is capable of being turned to move the housing and the nut linearly between an adjusted in position, an on center position and an adjusted out position;

a base plate coupled to the socket of the anti-backlash component; and a bracket movably coupled to the housing of the anti-backlash component via a first fastener and movably coupled to the base plate via a second fastener;

wherein the nut is coupled to the bolt in a direction that applies a force opposing a force applied by the bolt to remove backlash.

8. The anti-backlash assembly of claim 7, wherein the base plate and the bracket are movably coupled to rotationally move between a respective adjusted in position, a respective on center position and a respective adjusted out position as the housing and the nut are is linearly moved between the adjusted in position, the on center position and the adjusted out position.

9. The anti-backlash assembly of claim 7, wherein the socket and the spherical end of the bolt are coupled via an interference fit.

10. The anti-backlash assembly of claim 7, wherein the socket comprises a chamfered bottom opening.

11. The anti-backlash assembly of claim 7, wherein the socket comprises an opening on a side.

12. The anti-backlash assembly of claim 11, further comprising:

a screw inserted into the opening on the side of the socket and in contact with the spherical end of the bolt.

13. The anti-backlash assembly of claim 7, wherein the anti-backlash assembly is coupled to a mounting bracket for a satellite dish.

* * * * *